United States Patent [19]

Hambric

[11] Patent Number: 5,214,973
[45] Date of Patent: Jun. 1, 1993

[54] TRACTION DRIVE POWER TRANSMISSION SYSTEMS

[76] Inventor: Lori H. Hambric, P.O. Box 1134, Charles Town, W. Va. 25414-7134

[21] Appl. No.: 820,772

[22] Filed: Jan. 15, 1992

[51] Int. Cl.⁵ ............................................. F16H 15/02
[52] U.S. Cl. .................................... 476/69; 74/721; 476/68; 476/70
[58] Field of Search .................. 74/190.5, 191, 194, 74/199, 200, 201, 202, 721

[56] References Cited

U.S. PATENT DOCUMENTS

| | | | |
|---|---|---|---|
| 1,231,344 | 6/1917 | Fisher | 74/721 |
| 1,279,117 | 9/1918 | Jewell | 74/721 |
| 1,655,503 | 1/1928 | Knoller | 74/191 X |
| 2,097,007 | 10/1937 | Weisel | 74/200 |
| 2,595,367 | 5/1952 | Picanol | 74/200 |
| 3,292,443 | 12/1966 | Perruca | 74/200 |
| 4,137,785 | 2/1979 | Virlon | 74/199 X |

FOREIGN PATENT DOCUMENTS 649712  1/1951  United Kingdom ............... 74/200

Primary Examiner—Allan D. Herrmann

[57] ABSTRACT

Traction drive transmissions which may be utilized as speed increasers or speed reducers for various power and rotary motor applications including for use in transmissions for helicopter main rotor and tail rotor drives wherein power from the primary input source is transmitted to output shafts or driven elements which may be disposed at a variety of angular relationships with respect to the input source through multiple rollers which are shaped and in frictionally driven contact with one another so as to effectively divide the input load into multiple power paths to the output shafts or driven elements and wherein the rollers are oriented so as to reduce or eliminate the radial loading of stresses on the bearings in which the rollers are mounted.

13 Claims, 3 Drawing Sheets

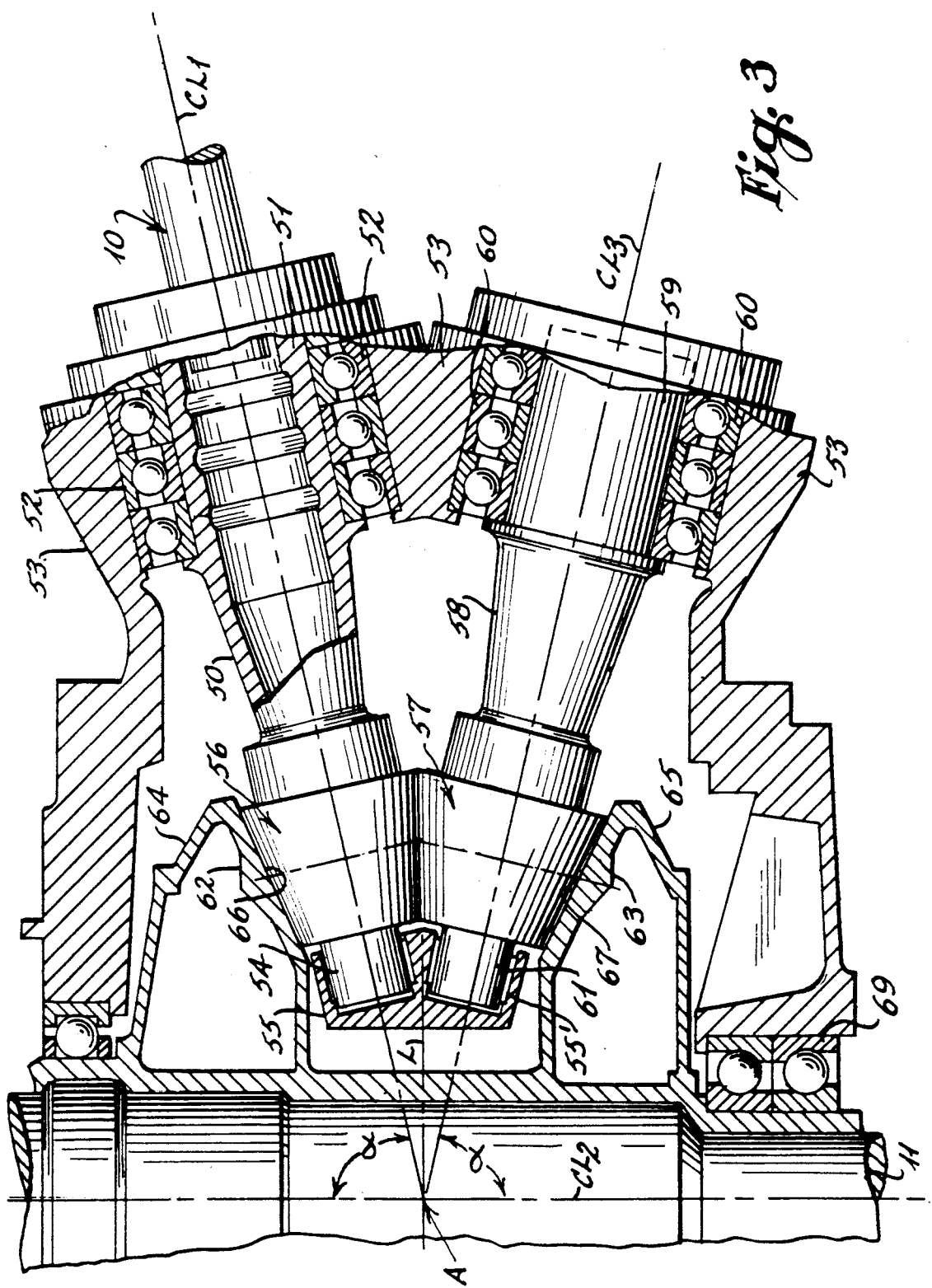

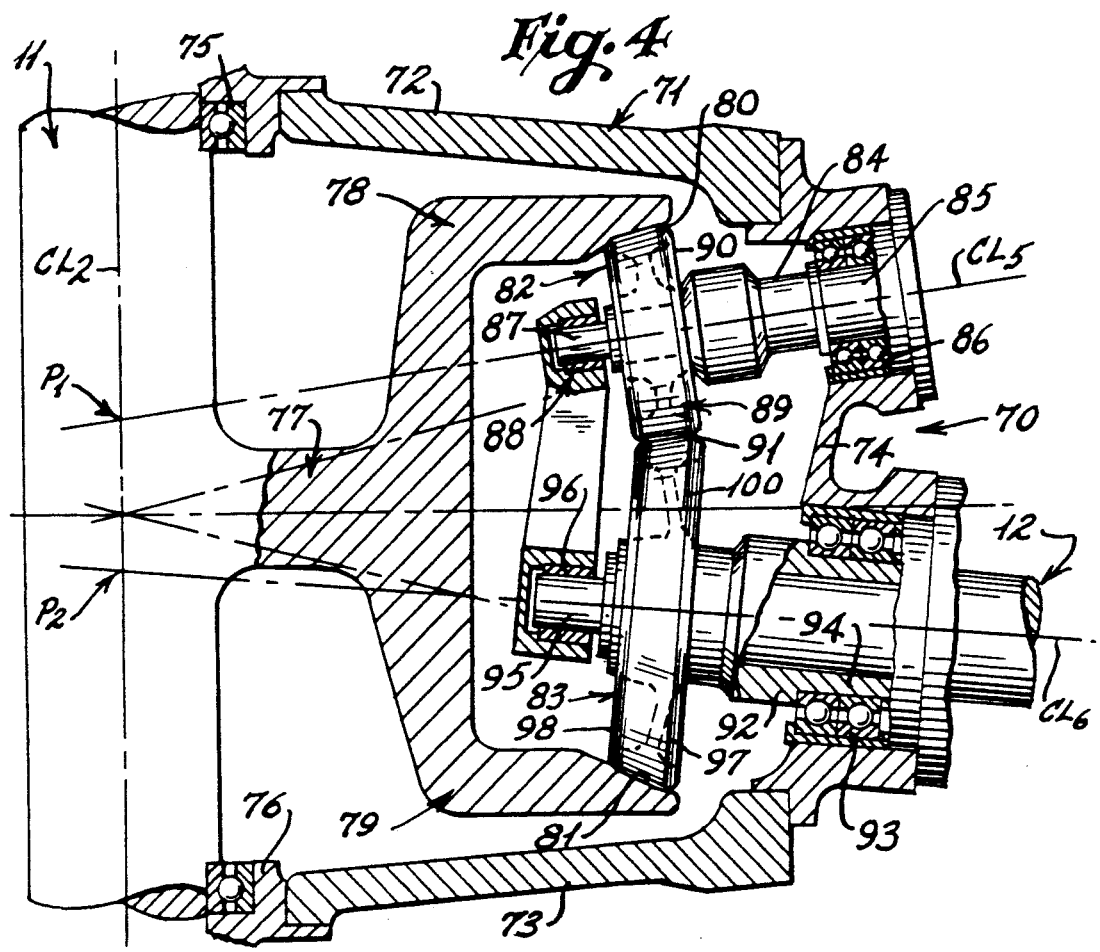
Fig. 4
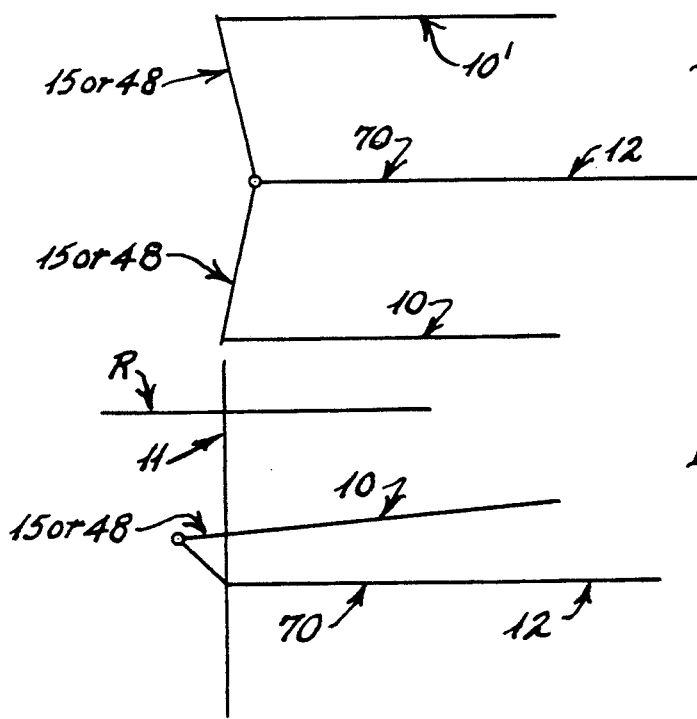
Fig. 5
Fig. 6

TRACTION DRIVE POWER TRANSMISSION SYSTEMS

BACKGROUND OF THE INVENTION

1. Field of the Invention

This invention is generally directed to power transmission systems which are used to link rotary drive input shafts with output shafts or driven elements and more specifically to traction drive systems which utilize surface contact roller elements to divide input loads into multiple power paths to the output shafts or driven elements. The contacting roller elements may include tapered roller elements which will permit the transmission of drive energy or motion to be directed to the output or driven element along a variety of angularly oriented approaches which thereby permits the traction drives of the present invention to have particular utility in transmitting power to helicopter rotors in place of more conventional bevelled gearing, or in hydrofoil propeller drives or "surface effect" (hover craft) which require very high horsepower rates in an angular sense.

2. Summary of the Invention

This invention is directed to multiple roller traction drives which can be used to transmit input motion, energy or power through split power or drive paths to a driven shaft or element regardless of the physical angular relationship the input shaft may have with respect to the output or driven shaft or element. Power from the primary input is transmitted through a first roller member which may be shaped or patterned so as to compensate for any angular approach the input shaft or output shaft may have relative to the energy splitting roller elements. The first roller member is in rotating surface contact with at least one other roller member and both roller members have opposing contact surfaces which frictionally and drivingly engage movable or rotatable contact elements which are carried by the input or output shafts or driven elements. As power is transmitted simultaneously and in opposite directions between the friction drive rollers and the rotatable contact elements which interface an input or output shaft or element therewith, radial stresses on the bearings in which the friction drive rollers are mounted are effectively eliminated or reduced.

In a first embodiment of the invention, power is transmitted through a 90° orientation between the input shaft and an output shaft such as the primary drive shaft or mast for the main rotor of a helicopter. The roller elements of the first embodiment are generally annular in configuration with the input and power splitting rollers having opposing and engaging convex and concave outer surface portions so as to create an elliptical area of contact therebetween.

In a second embodiment of the invention, a friction or traction drive is disclosed having special utility in transmitting power from the motor drive or input shaft of a helicopter to the main rotor drive shaft or mast. As the input shaft is necessarily mounted in an angular relationship with respect to the rotor mast, the traction rollers are bevelled or tapered along their length. In this embodiment, the power splitting roller or rollers are angularly mounted in appropriately positioned bearings so as to enable a continuous surface to surface contact between the input roller and the power splitting roller or rollers. The friction drive rollers are frictionally engaged in opposing directions with bevelled or angled outwardly extending rotary contact elements which are fixedly carried by the rotor mast.

In a third embodiment of the invention, a backdrive traction drive system is disclosed having primary utility in converting and transmitting input from the vertically oriented primary rotor mast or drive shaft to the tail rotor assembly of a helicopter. In this embodiment, power from the main rotor is transmitted through annular outrigger contact elements which are mounted to the rotor mast and which have opposing and slightly concave surfaces which engage with the outer convex surfaces of an output and reactor or power splitting rollers. The rollers are annularly shaped having outer convex surface portions which are angled slightly toward the primary rotor mast or shaft so as to be properly aligned to resist slippage between the surfaces of the outrigger elements and the area of contact with the rollers.

It is the primary object of the present invention to provide traction drives for use in transmitting power between power input shafts and output shafts or driven elements wherein the power is divided or split into alternate load paths to the driven elements so that the contact forces and stresses on any single transmission element are reduced and shared with or distributed to adjacent power transmitting components.

It is another object of the present invention to provide traction drive systems for connecting driven elements or shafts to driving elements or shafts which are angularly disposed in relationship to one another in such a manner that stresses on the connecting or power transmitting drive components are equally balanced so as to reduce the radial or stress loading of the bearings which support such drive components.

It is another object of the present invention to provide traction drives having multiple roller drives which utilize a plurality of roller shapes and wherein power or motion is transferred through surface contact causing elastohydrodynamic films within the roller contact areas.

It is also an object of the present invention to provide a power or motion transmission system for use in connecting a driven element to an input element wherein the power transmission is accomplished through drive traction roller elements so that a substantial reduction is achieved in the operational noise levels inherent in power or motion systems utilizing concentrated bevel gearing.

It is yet another object of the present invention to provide power transmission systems for helicopters, naval or marine vessels or other equipment which are more reliable, quieter and safer than conventional bevel gearing systems and wherein an audible indication is created to alert operators or pilots of potential problems in the transmission system as the failure of traction drive elements will be first evidenced by an increased operational noise level resulting from faulty surface contact elements.

Another object of the present invention is to reduce the cost of manufacturing power transmission systems including those used in helicopters and aircraft, or marine vehicles as traction driven rollers can be produced more easily than bevel gearing which requires cutting and grinding of specific tooth profiles.

BRIEF DESCRIPTION OF THE DRAWINGS

FIG. 3 is a partial cross-sectional view of a second embodiment of traction drive transmission system for use in connecting the drive shaft of an engine turbine to the rotor mast of a helicopter wherein the input is angularly oriented with respect to the rotor mast.

FIG. 4 is a partial cross-sectional view of a third embodiment of the present invention wherein the vertical rotor mast of a helicopter or an angular drive for fans for "surface effects" or propeller drives for hydrofoils is connected to the tail rotor drive shaft by way of a traction drive transmission which transfers power from the mast into split paths to the output or tail rotor drive shaft.

FIG. 5 is a top plan schematic illustration of the relationship between twin engine drive shafts, rotor mast and tail rotor drive connection for a twin engine helicopter utilizing the transmission systems of FIGS. 3 and 4.

FIG. 6 is a side view schematic illustrating the relationship between the components of FIG. 5.

DESCRIPTION OF THE PREFERRED EMBODIMENT

Figure 1:
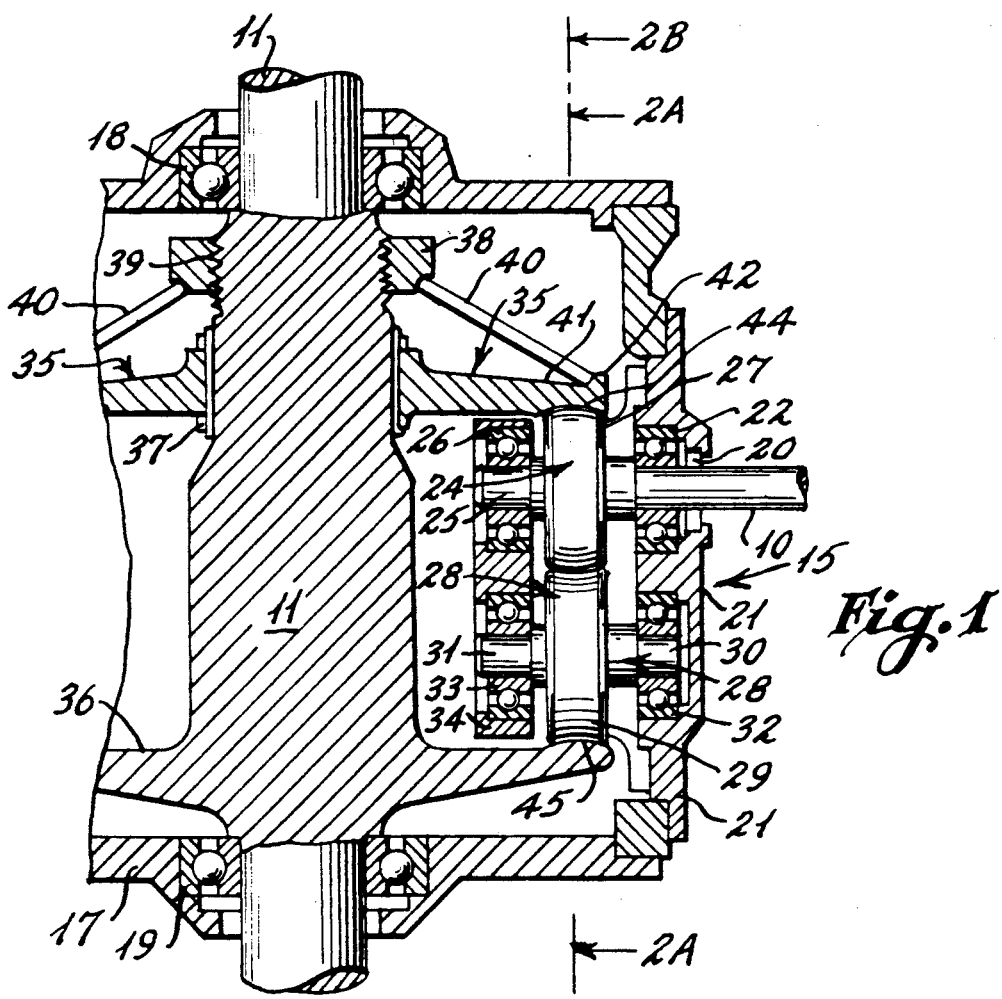
FIG. 1 is a partial cross-sectional view showing the first embodiment of traction drive system of the present invention showing power transmission between a drive input positioned generally normal to the axis of a driven aircraft rotor mast, or a tail rotor drive.

The traction drive transmission systems of the present invention will be primarily discussed with regard to transmitting power from the input drive shafts 10 and 10' of the turbine engines of a twin engine helicopter to the main rotor R through mast 11 and the tail rotor through drive shaft 12. With particular reference to FIGS. 5 and 6, there are illustrated, in diagram form, the general center line relationship of the engine input drive shafts 10 and 10' with respect to the rotor mast 11 and the tail rotor drive shaft 12. Generally, the engine drive shafts will be connected to the rotor mast 11 through a first traction drive system 15 or 48 (FIGS. 1 and 3) which will be discussed in greater detail with respect to the first and second embodiments of the invention. Power is taken from the main or rotor mast 11 to provide a backdrive output to the tail rotor drive shaft 12 by way of a second traction drive transmission system 70 (FIG. 4) which will be described in greater detail hereinafter with respect to the third embodiment of the invention.

As previously discussed, it is one of the primary objects of the present invention to provide traction drive systems to connect input shafts to angularly disposed driven shafts in such a manner that the power is distributed over several paths thereby enabling forces, loads and stresses to be distributed to different elements in the transmission system. This power splitting will have the beneficial effect of reducing the stress load carried by any one element of the transmission system. In addition, the traction drive transmission systems are adaptable to permit the transmission of power through varying degrees of relationship or intersection between driving and driven elements. Radial loads cancel out on input rollers but reversing secondary rollers act like idlers, so radial forces on these do not cancel out.

Although the embodiment of the invention shown in the drawings are related to uses of traction drive transmission systems in connection with the transmission of power in a helicopter, the traction drive systems of the present invention could be used in other environments where it is desired to divide the load between the power input and output or in other situations where it is desired to do away with more conventional bevel gearing.

With specific reference to FIG. 1 of the drawings, a first embodiment 15 of traction drive transmission system is shown for use in connecting an input shaft 10 with an output drive shaft 11 such as the mast of a helicopter rotor. As shown in the drawings, this particular embodiment of the invention is adapted to connect the drive shaft to the output shaft or driven element when such shafts are in generally perpendicular relationship with respect to one another.

In this embodiment, the driven element or shaft which is represented as the mast 11 of the helicopter rotor is shown as being mounted between upper and lower mast support housing portions 16 and 17, respectively. The mast is rotatably supported between the elements 16 and 17 by way of upper and lower bearings 18 and 19.

The power input shaft 10 is disposed through a central opening 20 in the front wall 21 of the housing and is rotatably supported therein by bearing elements 22. The end of the input shaft 10 is connected to a first traction drive roller or power input roller 24 which has an extended axle portion 25 which is rotatably supported within bearings 26. The power input roller 24 has an outer driving surface 27 which is shown as being generally annular and convex in configuration.

In order to divide or split the incoming power transmitted from the drive shaft 10, the power input roller 24 is in rolling contact or engagement with a power splitting or reactor roller 28. The reactor rollers is also annular and includes an outer surface 29 which is generally concave in configuration so as to be cooperatively seated with the convex face or surface 27 of the power input roller 24. The reactor roller is mounted on a pair of stub shafts 30 and 31 which are carried in opposing bearings 32 and 33 which are mounted in opposite portions of the housing as shown at 21 and 34. The traction drive rollers 24 and 28 are connected to the output shaft or rotor mast 11 by a pair of outwardly extending generally circular contact elements 35 and 36 which are shown as being connected to the mast. The lower contact element 36 is shown as being generally integrally formed with or fixedly secured with respect to the mast 11. Although the upper circular contact element may likewise be fixed with relationship to the mast 11, as shown in the drawings, it may be movable or adjustable along splines 37 which are fixed to the mast. In order to retain the upper circular contact element in a fixed position with regard to the splines 37, an adjustable lock nut 38 is mounted on threads 39 formed on the output shaft or mast 11. A conical spring element 40 abuts the upper surface 41 of the upper contact element at a point adjacent the outer end 42 thereof. In this manner, the upper annular contact element may be adjustably positioned or tensioned with respect to roller element 24.

The outer and lower portion of the upper contact element includes an annular concave surface 44 which interfaces with the convex outer surface 27 of the power input roller 24 at a point which is generally diametrically opposed to the contact between the power input roller and the outer surface 29 of the power splitting or reactor roller 28. Likewise, the outer and uppermost portion of the lower circular contact element 36 is provided with a raised generally convex contact surface 45 which is of a size to cooperatively engage with the concave surface 29 of the reactor roller 28. The point of contact between the lower circular contact element and reactor roller 28 is also diametrically opposed with the point of contact between the power input roller 24 and the reactor roller 28. Because of the interfaces or contacting relationships between the upper and lower contact elements and the first and second traction drive rollers, any radial load placed on the bearings which support the first and second traction drive rollers will be reduced or eliminated.

Figure 2A:
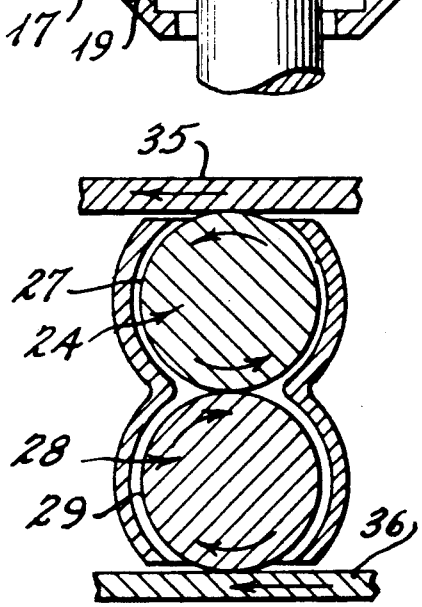
FIG. 2a is an enlarged illustrational view showing the rotary relationship between the two traction rollers and contact elements of the present invention as shown in FIG. 1.

With particular reference to FIG. 2a, a schematic illustration is shown wherein the first or power input roller 24 is rotating in contact with the upper contact element 35 and the lower or second traction drive roller 28 which is simultaneously in rolling contact with the lower contact element 36. The arrows indicate the general movement of the various elements with respect to one another as power is received from the input shaft 10. As the rotation of the upper and lower contact plates or elements is in the same direction, the resultant lateral load on the bearings supporting the oppositely rotating traction drive rollers is effectively cancelled. In addition, the driven elements for the contact elements 35 and 36 need only react to the radial load which is directed against such plates by the thrust of the input drive shaft 10.

In the operation of the traction drive transmission system 15 of the first embodiment of the invention, power from the input shaft 10 is split between the first and second traction drive rollers 24 and 28 and thereafter is transmitted through upper and lower drive or power paths to the upper and lower outwardly extending contact elements 35 and 36 which are connected to the output or rotor mast 11. As the traction drive rollers revolve, they will contact one another at a point which is diametrically opposed to their interface with the upper and lower contact elements thereby driving such elements simultaneously in the same direction. The amount of pressure between the contact points of the upper and lower contact elements and the first and second traction drive rollers may be selectively adjustable through the adjusting nut 38 which may be used to increase or decrease the pressure of the upper contact element through the spring element 40.

Figure 2B:
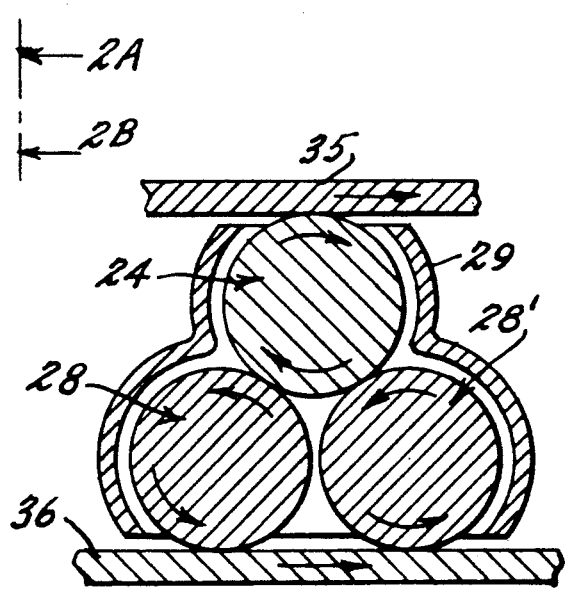
FIG. 2b is an enlarged illustrational view showing the rotary relationship between a single input and two power splitting rollers and the contact elements as shown as a modification of FIG. 1.

Although the embodiment shown in FIGS. 1 and 2 discloses only a single reactor or power splitting roller 28, it should be noted that additional rollers 28' could be utilized to split the power path into a third path as shown in FIG. 2B, and thereby further reduce the amount of stress which must be directly related to any one roller. Additional rollers, of course, may also be used with adjustment being made in the interfacing surfaces of the power input roller and the additional reaction rollers 28'.

The division of the power input into two or more paths permits the power capacity of a given size of traction drive transmission system to be greatly multiplied. Further, the life expectancy of the traction drive rollers is directly related to the amount of compressive stress which is encountered between the contact points between the upper and lower contact elements and the drive rollers. As this compressive stress is split between two or more paths, the amount of stress is effectively reduced with respect to each roller.

With particular reference to FIG. 3, a preferred form of traction drive transmission 48 utilizing tapered roller elements is disclosed. As shown in the drawings, this embodiment is also adapted for specific use for transmitting power from an input turbine on a helicopter to the rotored mast 11 in such a manner that the power is transmitted through split power paths to the mast. As with the prior embodiment, this embodiment of the invention could also be used to transmit power from other input power sources to other output drive shafts or drive elements and therefore has other utility than specifically mentioned with regard to this example.

In this embodiment, the power input shaft 10 from the engine turbines is shown as being disposed on a center line CL1 which intersects the center line CL2 of the rotor mast 11 at an acute angle. In order to effectively split the power from input shaft 10, the shaft is connected to or integrally formed with a rotary spindle 50 which is mounted in driving relationship to the input shaft and which is supported at one end 51 by a plurality of roller bearings 52 which are contained within the outer portion of the transmission housing 53. The innermost end 54 of the rotary spindle is supported within an inner bearing 55. Mounted adjacent the inner end of the rotary spindle 50 is a first tapered traction drive roller 56 which is fixedly mounted so as to rotate simultaneously with the rotary spindle. The first tapered traction drive roller 56 acts as the power input roller and power is divided therefrom by use of a second tapered traction drive or reactor roller 57 which is mounted on a support shaft 58 carried at its outer end 59 in a series of bearing elements 60 and at its inner end 61 in roller bearing 55'.

As noted in the drawings, the center line of the first or input roller bearing 56 is disposed along the center line of the turbine input drive shaft CL1 and intersects the axis of the rotor mast at a first angle alpha. Likewise, the center line CL3 of the second tapered traction drive roller or the reactor roller 57 is aligned at a common apex indicated at A with a point of intersection from the turbine input shaft through a negative angle alpha. Therefore, the center lines CL1 and CL3 of each of the shafts which support the first and second traction drive rollers 56 and 57 are equally angularly displaced on each side of a line L which forms a 90° angle to the center line CL2 of the output shaft or rotor mast 11.

In order to transmit power from the traction drive transmission roller elements 56 and 57 to the output or rotor mast 11, a pair of outwardly extending annular contact elements 62 and 63 are carried by support or outrigger elements 64 and 65 so as to be fixedly secured to the output shaft 11. Each of the contact portions includes a roller engaging surface portion 66 and 67, respectively. The surface 66 of contact element 62 cooperatively engages the tapered roller 56 while the tapered surface 67 engages the tapered surface of the roller 57. As the contact elements are connected in driving relationship with respect to the output shaft 11, they will cause such shaft to be rotated in response to the driving engagement between such elements and the first and second traction drive rollers 56 and 57.

As with the prior embodiment of the invention, second or additional reactor rollers 57 may be provided to receive power from the input traction drive roller 56. Such additional reactor rollers would effectively split the incoming power and would also be aligned so as to intersect the apex point A of the output shaft or rotor mast at an angle alpha similar to that with respect to the second traction drive roller 57.

With continued reference to FIG. 3, the output shaft or mast 11 is shown as being rotatably supported by bearing elements 68 and 69 which are mounted within the housing 53 which supports the output shaft at spaced locations along its length.

In this embodiment, the bearings 60 and 55' which support the reactor roller 57 are not subject only to radial load relating to torque as the roller acts as an idler and any thrust load resulting to the bearings is from the tangential driving forces only and are not otherwise affected by the contact forces of the 62 and 63 elements or the rollers themselves. As with the prior embodiments, the points of contact between each of the elements are aligned and made torque sensitive so that the resulting stress on any roller is equally distributed on opposite sides thereof due to equal torque being transmitted by both rollers to their output thereby relieving the radial stress on the bearing elements. There will, however, be a thrust load developed upon bearing elements 62 and 63 due to the angle of contact between the contact portions and the roller elements 56 and 57. By utilizing an additional reactor roller such as 57, the amount of thrust or load which is placed upon the supporting bearings of such drive rollers will be effectively reduced.

Due to the reaction in one side of the input roller 56 with contact surface 66 and an offset reaction by contact on the other side with idler roller 57 there is no radial load transmitted to the input roller. Also, the input or first tapered traction drive roller support bearings 52 and 55 do not experience any radial load unlike that of the input traction drive rollers of the first embodiment.

It should be noted with respect to this embodiment of the invention that although the input from the turbine is being disclosed as incoming through the upper roller designated 56, the upper roller could act as the reactor or power splitting idler roller with the turbine input connected in line with the second tapered traction drive roller 57. Additionally, each of the traction drive rollers 56 and 57 of the present invention could be used to withdraw power from a rotating mast element in a reverse or backdrive system similar to that which will be discussed hereinafter with respect to the third embodiment of the invention.

With specific reference to FIG. 4 of the drawings, a third embodiment of the invention is disclosed. In this embodiment, power is to be taken from the rotor mast 11 which is being rotated by a traction drive transmission 48 similar to that discussed above with respect to the second embodiment. Power from the rotor mast will be transferred through a backdrive traction drive transmission 70 which acts as a speed increaser so that the number of RPMs transferred from the rotor mast to a tail rotor drive shaft 12 is effectively increased through the transmission. The transmission 70 is mounted within housing 71 having upper and lower walls 72 and 73 respectively and annular side wall portion 74. The rotor mast 11 is rotatably extended through the housing by means of upper and lower roller bearings 75 and 76.

Integrally formed with or securely attached to the rotor mast 11 is an outwardly extending circular flange 77 having a pair of bifurcated annular flanges 78 and 79 extending therefrom. The annular flange 78 includes a lower contact surface 80 and the annular flange 79 includes an upwardly oriented contact surface 81. Mounted between the contact surfaces of the flange 78 and 79 are a pair of traction rollers. In this embodiment, the upper traction roller 82 serves as the reactor roller while the lower roller 83 serves as the power output roller. The traction drive reactor roller 82 is shown as being mounted on a support shaft 84 which is mounted at its outermost end 85 within a double bearing assembly 86. The innermost end 87 of the support shaft is supported in a single bearing assembly 88. The roller 82 is formed having an innermost hub 89 which is fixedly secured to the shaft 84. An outwardly extending and forwardly oriented flange 90 extends in an annular manner outwardly from the hub 89 and includes an integrally formed annular contact surface 91 on the outer surface thereof. It should be noted that the contact surface is generally convex in configuration and due to the forward sloping of the annular flange, such surface is oriented slightly toward the rotor mast.

As shown in the drawings, the traction drive reactor roller 82 is mounted so that the elongated axis CL5 thereof extends through a point P1 which intersects with the center line CL2 of the rotor mast.

The output traction drive rollers 83 is shown as being of a larger diameter than the reactor roller 82 for purposes which will be discussed in greater detail hereinafter. The power output roller is mounted on a support shaft 92 which is mounted within double roller bearings 93 adjacent the outer end 94 thereof. The innermost portion of the shaft 95 is mounted within a single roller bearing 96. The outermost portion 94 of the shaft is selectively connectable to the tail rotor drive shaft 12 by conventional connector means.

The power output traction drive roller 83 includes an inner hub 97 which is supported by the shaft 92. An annular flange member 98 extends from the inner hub outwardly and toward the rotor mast and includes an annular contact portion 100. The contact surface or portion 100 is shown as being generally convex in configuration. As shown in the drawing, the center line CL6 of the support shaft 92 of the power output traction drive roller 83 extends at an angle to the rotor mast 11 and intersects at a point P2 which is spaced from the point of intersection P1 between the center line CL2 of the rotor mast and the center line CL5 of the reactor roller 82.

As with the prior embodiments of the invention, the contact between the traction drive rollers and the contact surfaces of the rotating flange members 78 and 79 should be aligned so that any forces or stresses between the respective points of contact are offset as much as possible. However, in this embodiment, some stress or thrust will be created due to the position of the points of contact with respect one another. As shown, the point of contact between contact surface 80 and the traction drive reactor roller 82 is counteracted by the point of contact between the contact surfaces 91 and 100 of the reactor roller with the output traction roller. Likewise, the point of contact between the lower contact surface 81 and the contact surface 100 of the output traction drive roller 83 is generally offset or opposed by the point of contact between the traction drive rollers. Due to the angular relationship between the points of contact between the drive rollers and the rotating flange elements 78 and 79 carried by the rotor mast, a certain amount of thrust will be imparted against the bearing elements 93.

As previously mentioned, the diameter of the output traction drive roller 83 is greater than that of the reactor roller 82. By varying the size between the two rollers, it is possible to obtain a variance in the speed ratio between the rollers to thereby obtain proper drive output or RPM to the tail rotor drive shaft. In the present example, the power output traction drive roller will be rotated at a lesser RPM than that of the reactor roller due to the increased size in diameter of the roller. It is, of course, possible to reverse the sizes of the reactor and the power output rollers to achieve an increase speed effect on the power output roller with respect to the reactor roller. However, because the diameter of the output traction drive roller 83 is less than the effective diameter of the contact elements 78 and 79, the rotation thereof will be significantly increased with respect to the rotor mast.

As with the other embodiments of the invention, the traction drive transmission 70 may be used in other environments other than transferring power from the helicopter rotor mast to the tail rotor drive shaft. Such transmission could be used to interface various output drive shafts with a primary generally perpendicularly extending power input shaft in a manner similar to that described with respect to the helicopter embodiment. In the operation of the third embodiment, as the helicopter rotor mast 11 is rotated the outwardly extending annular flange 77 will be simultaneously rotated therewith. As the contact surface portions 80 and 81 engage the contact surface portions 91 and 100 of the traction drive rollers 82 and 83, such rollers will be caused to rotate within their bearing supports. As power is being transmitted through a pair of traction drive rollers, the power path is effectively split with the amount of load being effectively transferred between the reactor roller 82 and the power output roller 83. As with the prior embodiments, a pair of reactor rollers 82 may be utilized in order to create a third power path between the rotor mast and the tail rotor drive shaft.

We claim:

1. A traction drive power transmission system for drivingly engaging an input drive shaft having a longitudinal axis and extending from a rotary source of power supply to a rotatable working member mounted to a driven shaft through a split power path comprising, a power input drive roller means mounted to the input drive shaft so as to be rotatably driven about the longitudinal axis of the input drive shaft, a power splitting reactor roller means mounted adjacent said input drive roller means, each of said input drive roller means and said reactor roller means having outer surfaces in engagement with one another, a pair of spaced opposing flange members mounted to the driven shaft and having generally opposing annular contact surfaces, said contact surface of one of said flange members being engageable with said outer surface of said input drive roller means and said contact surface of the other of said flange members being engageable with the outer surface of said reactor roller means, at least one secondary power splitting reactor roller means having an outer surface, said secondary reactor roller means rotatably engaging said outer surface of said input roller means and said contact surface of said other of said flange members mounted to the driven shaft, whereby power from the input shaft is directed to the rotatably working member through said input roller means, said reactor roller means and said at least one secondary reactor roller means.

2. The traction drive power transmission system of claim 1 in which said outer surface of each of said input drive roller means and said reactor roller means are generally convex, and said opposing contact surfaces of said flange members are generally concave.

3. The traction drive power transmission system of claim 1 in which said input drive roller means includes a concave outer surface and said reactor roller means and said at least one secondary reactor roller means include a concave outer surface, said contact surface of said one of said flange members being generally concave and said contact surface of said other flange member being generally convex.

4. The traction drive power transmission system of claim 1 including a first pair of spaced bearing means for supporting said input drive roller means and second pairs of spaced bearing means for supporting said power reactor roller means and said at least one secondary power splitting reactor roller means, and said pair of opposing flange members being mounted to a central annular hub which extends outwardly from the driven shaft.

5. The traction drive power transmission system of claim 4 in which said input drive roller means includes a first shaft disposed between said first pair of spaced bearings, said first shaft having an elongated axis which extends through a point along an elongated axis of the driven shaft, said reactor roller means includes a second shaft mounted between said second pair of spaced bearings and having an elongated axis which intersects the axis of said driven shaft at said point.

6. The traction drive power transmission system of claim 4 in which said input drive roller means is mounted on a first shaft which extends between said first spaced bearing means, said first shaft having an elongated axis which intersects an elongated axis of the driven shaft at a first point, said reactor roller means mounted on a second shaft which extends between said second spaced bearings and having a central axis which intersects the elongated axis of the driven shaft at a second point spaced from said first point and secondary power transmission means extending from said reactor roller means away from said driven shaft whereby said reactor roller means provides power to both the rotatably working member and to a supplemental spaced working member.

7. The traction drive power transmission system of claim 1 in which at least one of said flange members is adjustably mounted axially of the driven shaft.

8. The traction drive power transmission system of claim 7 including means for resiliently urging said flange members toward one another.

9. A traction drive power transmission system for drivingly engaging an input drive shaft having a longitudinal axis and extending from a rotary source of power supply to a rotatably working member mounted to a driven shaft through a split power path comprising, a power input drive roller means mounted to the input drive shaft so as to be rotatably driven about the longitudinal axis of the input drive shaft, a power splitting reactor roller means mounted adjacent said input drive roller means, each of said input drive roller means and said reactor roller means having outer surfaces in engagement with one another, a pair of spaced opposing flange members mounted to the driven shaft and having generally opposing annular contact surfaces, said contact surface of one of said flange members being engageable with said outer surface of said input drive roller means and said contact surface of the other of said flange members being engageable with the outer surface of said reactor roller means, a first pair of spaced bearing means for supporting said input drive roller means and a second pair of spaced bearing means for supporting said reactor roller means, said input drive roller means having a first shaft disposed between said firs pair of spaced bearings, said first shaft having a central axis which extends through a point along an elongated axis of the driven shaft, and said reactor roller means having a second shaft mounted between said second pair of spaced bearings and having a central axis which intersects the axis of said driven shaft a said point, whereby power from the input shaft is directed to the rotatably working member through both said input drive roller means and said reactor roller means.

10. The traction drive power transmission of claim 9 in which each of said input drive roller means and said reactor roller means are elongated and tapered inwardly along their length so as to be of reduced diameter adjacent the driven shaft.

11. The traction drive power transmission of claim 9 in which the central axis of said first shaft intersects the elongated axis of said driven shaft at a first positive angle taken with respect to a perpendicular plane extending through the elongated axis of the driven shaft, said central axis of said second shaft intersects the elongated axis of said driven shaft at a second negative angle taken with respect to the perpendicular plane, and said first and second angles being equal to one another.

12. A traction drive power transmission system for drivingly engaging an input drive shaft having a longitudinal axis and extending from a rotary source of power supply to a rotatably working member mounted to a driven shaft through a split power path comprising, a power input drive roller means mounted to the input drive shaft so as to be rotatably driven about the longitudinal axis of the input drive shaft, a power splitting reactor roller means mounted adjacent said input drive roller means, each of said input drive roller means and said reactor roller means having outer surfaces in engagement with one another, a pair of spaced opposing flange members mounted to the driven shaft and having generally opposing annular contact surfaces, said contact surface of one of said flange members being engageable with said outer surface of said input drive roller means and said contact surface of the other of said flange members being engageable with the outer surface of said reactor roller means, a first pair of spaced bearing means for supporting said input drive roller means and a second pair of spaced bearing means for supporting said reactor roller means, said input drive roller means being mounted on a first shaft which extends between said first spaced bearing means, said first shaft having a central axis which intersects an elongated axis of the driven shaft at a first point, said reactor roller means mounted on a second shaft which extends between said second spaced bearings and having a central axis which intersects the elongated axis of the driven shaft at a second point spaced from said first point and secondary power transmission means extending from said reactor roller means away from said driven shaft whereby power from the input shaft is directed to the rotatable working member through said input roller means and said reactor roller means provides power to both the rotatable working member and to a supplemental spaced working member.

13. The traction drive power transmission system of claim 12 in which said outer surface of each of said drive input roller means and said reactor roller means are generally convex, said opposing contact surfaces of said flange members being generally concave.

* * * * *